L. P. HALLADAY.
AUTOMOBILE ATTACHMENT.
APPLICATION FILED MAY 21, 1910.
1,043,227.
Patented Nov. 5, 1912.
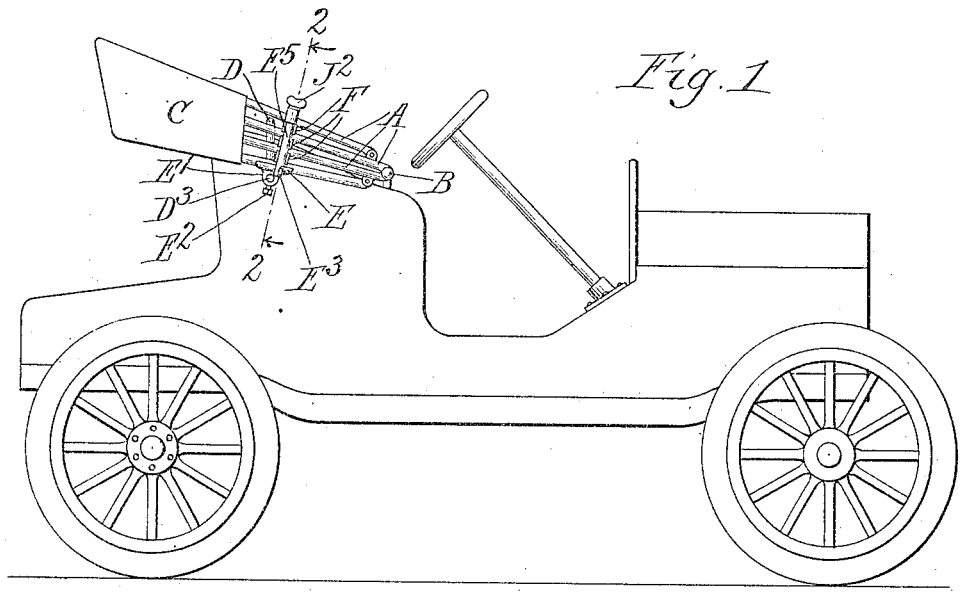
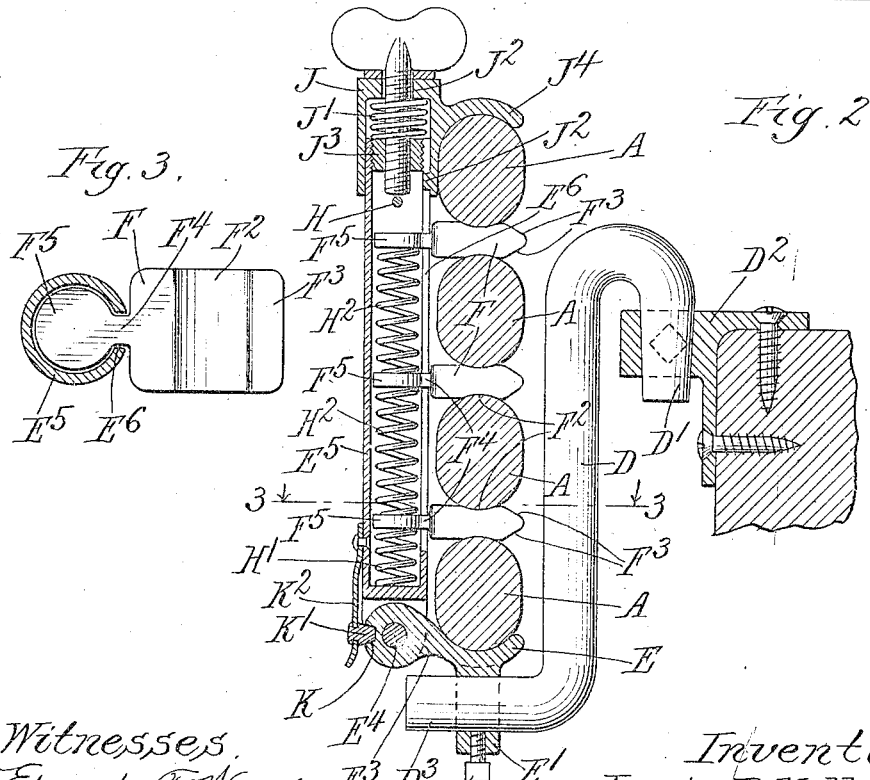
Witnesses
Edward T. Wray
Sophie B. Werner
Inventor.
Lewis P. Halladay
by
Attorneys.

UNITED STATES PATENT OFFICE.

LEWIS P. HALLADAY, OF CHICAGO, ILLINOIS.

AUTOMOBILE ATTACHMENT.

1,043,227.  Specification of Letters Patent. Patented Nov. 5, 1912.

Application filed May 21, 1910. Serial No. 562,606.

*To all whom it may concern:*

Be it known that I, LEWIS P. HALLADAY, a citizen of the United States, residing at Chicago, in the county of Cook and State of Illinois, have invented a certain new and useful Improvement in Automobile Attachments, of which the following is a specification.

My invention relates to automobile attachments and has for its object to provide means for maintaining the automobile or carriage top bows in fixed position when not in use.

It is illustrated in the accompanying drawings, wherein—

Figure 1 shows a side elevation of an automobile with the device attached; Fig. 2, an enlarged section along the line 2—2 of Fig. 1; Fig. 3, a section along the line 3—3 of Fig. 2.

Like parts are indicated by the same letter in all the figures.

The bows A, A, are pivoted at B to the automobile body in the usual manner and support the usual top C. The hanger D has the conical end $D^1$ to engage the bracket $D^2$ upon the body of the machine. It is provided at its lower extremity with the arm $D^3$. The cradle E is held by means of the downwardly depending ring $E^1$ and set screw $E^2$ upon the projection $D^3$, and supports by means of the lug $E^3$ and pivot $E^4$ the tube $E^5$, slotted at $E^6$.

The spacing members F are grooved upon their two sides at $F^2$ and have at one end the angular surfaces $F^3$, and are connected by means of the necks $F^4$ to the flat, circular disks $F^5$ which are loosely held within the tube $E^5$ in such manner that the members F may be simultaneously rocked in planes perpendicular to and parallel with the axis of the tube and may also be rotated about the axis passing through the neck $F^4$ and perpendicular to the apex of the angular surfaces $F^3$. The necks $F^4$ are projected through and loosely held within the slot $E^6$. The disks $F^5$ are held adjustably between the bottom of the tube and the cross piece H by means of the springs $H^1$, $H^2$.

The cap J which surrounds the end of the tube $E^5$ incloses the spring $J^1$ is held against rotation by means of the lug $J^2$ in the slot $E^6$ and is adjustably held in position by the thumb screw $J^2$ which is screw threaded into the plug $J^3$ in the end of the tube $E^5$. The cap J is provided with the outwardly extending hook $J^4$ in opposition to the upper one of the lugs. The bearing lug $E^3$ is notched at K to engage the latch $K^1$ mounted upon the spring $K^2$ upon the tube $E^5$.

It will be evident that while I have shown in my drawings an operative device, still many changes might be made in size, shape, and arrangement of parts without departing materially from the spirit of my invention, and I wish therefore that my drawings be regarded as in a sense diagrammatic.

The use and operation of my invention are as follows: When the top of an automobile is not in use it is folded over the back of the seat and it has been thought that some means are necessary whereby the bows may be rigidly held in proper position with respect one to another to prevent chafing of the bows and top and ultimate destruction of the apparatus. In order to do this, I provide a cradle rigidly mounted upon the automobile upon which the rear bow of the top may rest. I provide also a plurality of spacing members pivotally connected to said cradle which may be inserted one between each pair of bows. I provide also a thumb screw and retaining means for clamping all of the bows between said spacing members and said cradle. These members have comparatively sharp surfaces to enable them conveniently to be inserted between the bows and they are elastically mounted so that difference in size and angularity of the bows may be allowed for. By this means I provide a holding device which effectually prevents any rubbing or displacement of the carriage bows and top and which is simple and easy to apply and convenient in use. I provide a catch for maintaining the tube which supports said spacing members in the upper position when once it has been raised.

I claim:

1. The combination with a vehicle of a hanger, a cradle mounted upon said hanger, a tube pivotally mounted upon said cradle, spacing members supported within and projecting from said tube and free at one end, springs interposed between said spacing members within the tube, and a clamping device slidably mounted upon the end of said tube.

2. The combination with a set of vehicle top bows, of spacers free at one end adapted to be inserted between adjacent bows, a cradle upon which one of said bows rests, means for holding said bows rigidly against said spacers and upon said cradle, a frame within which said spacers are mounted, elastic means for holding said spacers in position, said frame pivotally mounted upon said cradle.

3. The combination with a set of vehicle top bows, of adjustable means for holding said bows in inoperative position, said means including spacers between said bows, said spacers having sharpened edges provided with depressions on either sides to engage the bows, a horizontally pivoted support for said spacers and means for attaching the spacers thereto so that they are slidable therealong.

4. The combination with a set of vehicle top bows, of a cradle, a tube pivotally mounted thereupon, a hook slidably mounted upon one end of said tube, flat disks slidably mounted within said tube and having lugs projecting laterally therefrom without said tube, and springs interposed between said disks.

5. A bow holder comprising a bracket, a slotted tube pivotally mounted thereon and rotatable in a plane substantially perpendicular to the bows, spaced disks loosely held within said tube and having spacing members outwardly projecting therefrom, said disks slidable in a direction parallel with the tube, rotatable about an axis formed by a continuation of one of the radii of said disks and rotatable in a plane perpendicular to the tube and also in a plane parallel with the tube.

6. A vehicle top bow holder comprising a support, a tube pivotally mounted upon the support to swing in a plane substantially perpendicular to the bows, spacers carried by the tube loosely held thereon and having an up and down and side to side rocking movement together with a rotary movement about their axes, and means for clamping said bows and said spacers together upon the support.

LEWIS P. HALLADAY.

Witnesses:
　PAUL J. GATHMANN,
　FRANCIS W. PARKER, Jr.